United States Patent
Pyle

(10) Patent No.: US 10,057,072 B2
(45) Date of Patent: Aug. 21, 2018

(54) INDUSTRIAL NETWORK CERTIFICATE RECOVERY BY IDENTIFYING SECONDARY ROOT CERTIFICATE

(71) Applicant: SCHNEIDER ELECTRIC USA INC., Palatine, IL (US)

(72) Inventor: Michael W. Pyle, Hermitage, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/587,812

(22) Filed: Dec. 31, 2014

(65) Prior Publication Data

US 2016/0191253 A1 Jun. 30, 2016

(51) Int. Cl.
| G06F 21/00 | (2013.01) |
| H04L 9/32 | (2006.01) |
| H04L 9/14 | (2006.01) |
| H04L 9/28 | (2006.01) |

(52) U.S. Cl.
CPC .............. H04L 9/3263 (2013.01); H04L 9/14 (2013.01)

(58) Field of Classification Search
CPC .......... H04L 9/0869; H04L 9/085; G06F 7/58
USPC .............................................. 380/28, 44, 30
See application file for complete search history.

(56) References Cited

U.S. PATENT DOCUMENTS

| 6,976,163 | B1 * | 12/2005 | Hind ...................... G06F 21/572 |
| | | | 713/1 |
| 7,069,452 | B1 * | 6/2006 | Hind ...................... G06F 21/572 |
| | | | 713/1 |
| 7,821,220 | B2 | 10/2010 | El-Ibiary |
| 8,458,768 | B2 | 6/2013 | Brabson et al. |
| 8,776,192 | B2 | 7/2014 | Schiefelbein |
| 2002/0095296 | A1 * | 7/2002 | Hind ....................... G10L 21/06 |
| | | | 704/500 |
| 2002/0095586 | A1 * | 7/2002 | Doyle ..................... G06F 21/32 |
| | | | 713/186 |
| 2002/0095587 | A1 * | 7/2002 | Doyle .................. G06Q 20/341 |
| | | | 713/186 |
| 2002/0095601 | A1 * | 7/2002 | Hind ..................... H04L 9/3231 |
| | | | 726/22 |
| 2003/0159044 | A1 * | 8/2003 | Doyle ..................... G06F 21/32 |
| | | | 713/176 |
| 2003/0212893 | A1 * | 11/2003 | Hind ..................... H04L 9/3236 |
| | | | 713/177 |
| 2005/0021969 | A1 * | 1/2005 | Williams .............. H04L 9/3268 |
| | | | 713/176 |

(Continued)

OTHER PUBLICATIONS

International Search Report for PCT/US2015/067823 dated Mar. 3, 2016.

(Continued)

Primary Examiner — Haresh N Patel
(74) Attorney, Agent, or Firm — Lando & Anastasi, LLP

(57) ABSTRACT

According to various aspects and embodiments, a programmable device configured for use within an industrial control system is provided. The programmable device includes a memory storing a plurality of root certificates, the plurality of root certificates including an active certificate and one or more secondary certificates, and at least one processor coupled to the memory. The at least one processor configured to receive an identifier of a secondary root certificate of the one or more secondary root certificates, and activate the secondary root certificate in response to receiving the identifier.

20 Claims, 4 Drawing Sheets

(56) References Cited

U.S. PATENT DOCUMENTS

| | | | | |
|---|---|---|---|---|
| 2006/0104238 A1* | 5/2006 | Hibino | | H04W 8/20 370/328 |
| 2006/0218403 A1* | 9/2006 | Sauve | | H04L 63/126 713/175 |
| 2006/0236379 A1* | 10/2006 | Negahdar | | H04L 63/062 726/5 |
| 2007/0028298 A1* | 2/2007 | Snyder | | H04L 9/321 726/3 |
| 2007/0055881 A1 | 3/2007 | Fuchs et al. | | |
| 2008/0120610 A1* | 5/2008 | Katano | | G06F 8/65 717/168 |
| 2009/0060187 A1 | 3/2009 | Doyle et al. | | |
| 2009/0187766 A1* | 7/2009 | Vuillaume | | G06F 21/33 713/176 |
| 2011/0202755 A1* | 8/2011 | Orsini | | H04L 63/029 713/151 |
| 2013/0227538 A1* | 8/2013 | Maruyama | | G06F 8/65 717/168 |
| 2013/0346747 A1* | 12/2013 | Ignatchenko | | H04L 9/3268 713/158 |
| 2014/0029039 A1* | 1/2014 | Deter | | G06F 21/45 358/1.14 |
| 2014/0130034 A1* | 5/2014 | Subbu | | G06F 8/665 717/172 |
| 2014/0141750 A1* | 5/2014 | Lazaridis | | H04L 63/0492 455/411 |
| 2014/0172722 A1* | 6/2014 | Smith | | G06Q 20/1085 705/71 |
| 2014/0298008 A1* | 10/2014 | Hulick | | H04L 63/0209 713/155 |
| 2014/0337616 A1 | 11/2014 | Kimberly | | |
| 2015/0074764 A1* | 3/2015 | Stern | | H04L 63/06 726/4 |
| 2015/0256345 A1* | 9/2015 | Vaid | | H04L 9/3268 713/158 |

OTHER PUBLICATIONS

"Certificate Management for Embedded Systems." Real Time Logic. Oct. 25, 2013. https://realtimelogic.com/blog/2013/10.

"Why do embedded stsyems store server's public certificate in ROM?" Stack Exchange. Jun. 21, 2013. http://security.stackexchange.com/questions/37814/why-do-embedded-systems-store-servers-public-certificate-in-rom.

Extended European Search Report from corresponding European Application No. 15876146.0 dated May 3, 2018.

* cited by examiner

INDUSTRIAL NETWORK CERTIFICATE RECOVERY BY IDENTIFYING SECONDARY ROOT CERTIFICATE

BACKGROUND

Technical Field

The technical field relates generally to industrial network systems and programmable devices, and in particular to systems and methods for industrial network certificate validation and recovery.

Discussion

Root certificates are one of the fundamental tools of cryptography and can be used in various authentication systems to validate certain types of encryption. Authentication systems used in operation technology (OT) systems invariably rely on Internet connectivity to manage certificates with one or more Certificate Authorities. However, many OT systems do not have access to the Internet. For example, many power monitoring systems (e.g., circuit breaker, relay, metering device, power meter, etc.) are intentionally isolated from the Internet for security assurance. Accordingly, these devices do not have access to Certificate Authorities for certificate management. As a result, traditional methods of tying certificates back to a root of trust at a Certificate Authority on the Internet, as used with online systems, is not possible. Nevertheless, the need to authenticate and validate received information, such as firmware updates, still exists. For example, it is desired that the firmware for an end device be signed and verified before it is accepted and executed. Unverified information can lead to system damage or exposed security. In the realm of industrial devices, and in particular, power monitoring systems, these concerns are of tremendous importance.

SUMMARY

According to various aspects and embodiments, a programmable device configured for use within an industrial control system is provided is provided. The programmable device is configured to locally store a plurality of redundant root certificates (e.g., Certificate Authority root of trust certificates), including an active root certificate and one or more secondary root certificates. When the security of a root certificate stored at the programmable device is compromised, the programmable device may receive an identifier of a secondary certificate of the one or more secondary root certificates and activate the secondary root certificate. In various embodiments, the identifier includes a non-root certificate signed using a private key corresponding to the secondary root certificate stored at the device. In some embodiments, simply receiving a certificate signed by a private key corresponding to a non-active, secondary root certificate will cause the programmable device to invalidate the active root certificate and promote the secondary root certificate to the active root certificate. In other embodiments, the programmable device is configured to validate the received certificate by dereferencing the identifier to identify the secondary root certificate. It is appreciated the systems and methods provided herein address security concerns in industrial network systems with the use of multiple, redundant root certificates, and allow validation and communication processes to function, revoke, and replace a compromised root certificate, even if a current private key has been compromised.

According to various aspects and embodiments, a programmable device configured for use within an industrial control system is provided. The programmable device includes a memory storing a plurality of root certificates, the plurality of root certificates including an active certificate and one or more secondary certificates, and at least one processor coupled to the memory. The at least one processor configured to receive an identifier of a secondary root certificate of the one or more secondary root certificates, and activate the secondary root certificate in response to receiving the identifier.

In one embodiment, the programmable device includes one of a utility meter, a circuit breaker, a protective relay, a PLC, a motor controller, and industrial network hardware. In a further embodiment, the plurality of root certificates includes one or more root certificates received from a plurality of certificate authorities.

In one embodiment, the identifier can include a certificate signed by a private key corresponding to the secondary root certificate. In a further embodiment, the processor is further configured to receive a package in association with the certificate, the package including at least one of a configuration file, a firmware update, license information, and a subcomponent upgrade, validate the certificate using the secondary root certificate, decrypt the package using a public key associated with the certificate, and apply the package to the programmable device. In an additional embodiment, the processor is configured to receive a replacement root certificate in association with the certificate, validate the certificate using the secondary root certificate, validate the replacement root certificate using the certificate, and store the replacement root certificate within the plurality of root certificates responsive to validating the certificate.

In one embodiment, the processor is further configured to deference the identifier to identify the secondary root certificate. In a further embodiment in which the identifier includes a certificate signed by a private key corresponding to the secondary root certificate, the processor configured to deference the identifier at least in part by validating the certificate using the secondary root certificate. In an additional embodiment, the processor is configured to deference the identifier at least in part by identifying, within a cross-reference, an association between the identifier and the secondary root certificate. In still a further embodiment in which the identifier includes a certificate signed by a private key corresponding to the secondary root certificate, the processor is configured to deference the identifier at least in part by iteratively attempting to validate the certificate using root certificates of the plurality of root certificates.

In one embodiment, the processor is further configured to remove the active root certificate responsive to activating the secondary root certificate.

According to another aspect, a method is provided. The method can include the acts of receiving at a programmable device having a memory storing a plurality of root certificates, the plurality of root certificates including an active certificate and one or more secondary certificates, an identifier of a secondary root certificate of the one or more secondary root certificates, and activating the secondary root certificate in response to receiving the identifier.

In one embodiment, the identifier can include a certificate signed by a private key corresponding to the secondary root certificate. In a further embodiment, the method can further include the acts of receiving a package in association with the certificate, the package including at least one of a configuration file, a firmware update, license information, and a subcomponent upgrade, validating the certificate using the secondary root certificate, decrypting the package using a public key associated with the certificate, and applying the package to the programmable device. In an additional embodiment, the method can further include the acts of receiving a replacement root certificate in association with the certificate, validating the certificate using the secondary root certificate, validating the replacement root certificate using the certificate, and storing the replacement root certificate within the plurality of root certificates responsive to validating the certificate.

In one embodiment, the method can further include the acts of dereferencing the identifier to identify the secondary root certificate. In a further embodiment, the method can further include the acts of dereferencing the identifier includes identifying, within a cross-reference, an association between the identifier and the secondary root certificate. In an additional embodiment in which the identifier includes a certificate signed by a private key corresponding to the secondary root certificate, dereferencing the identifier can include iteratively attempting to validate the certificate using root certificates of the plurality of root certificates.

According to another aspect, a non-transitory computer readable medium having stored thereon sequences of instruction is provided. The sequences of instruction can include instructions that will cause at least one processor to receive at a programmable device having a memory storing a plurality of root certificates, the plurality of root certificates including an active certificate and one or more secondary certificates, an identifier of a secondary root certificate of the one or more secondary root certificates, and activate the secondary root certificate in response to receiving the identifier. In one embodiment, the identifier can include a certificate signed by a private key corresponding to the secondary root certificate.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
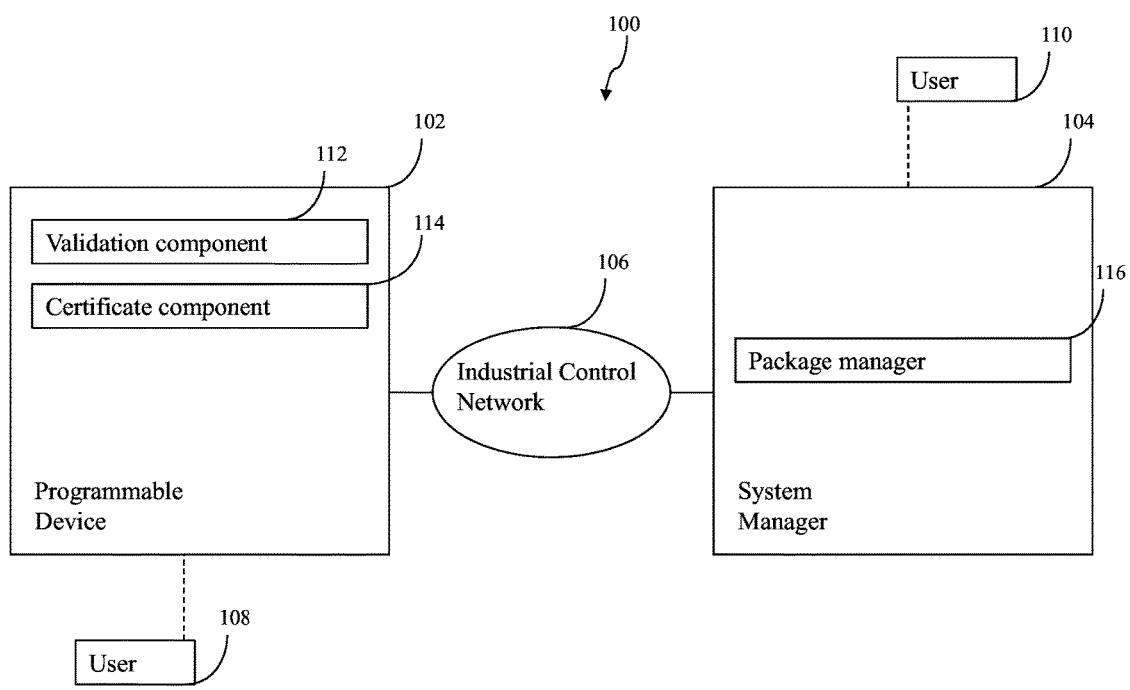
FIG. 1 is a block diagram including an example system for replacing compromised root certificates.

Some aspects and embodiments described herein include methods and systems for verifying the security of packages in an industrial control network. Other aspects and embodiments described herein include systems and methods for replacing compromised root certificates at a programmable device. As is understood, root certificates can be used to verify, identify, or otherwise confirm the source of a package associated with the certificate. A root certificate stored at the programmable device corresponds to a private key used to sign a certificate within or otherwise associated with the transmitted package. As used herein, "root certificate" refers to any public certificate stored at an end device that is used to validate other certificates, for example this can include a certificate authority root of trust public certificate. "Private key" refers to any private key used to sign a transmitter's certificate or data package, for example a root of trust private key. As understood, public certificates are publically available to all end devices and users, while private keys are proprietary to the certificate transmitter.

As discussed above, the need to authenticate and validate received information, such as firmware updates, still exists in systems isolated from, or having limited access to, the Internet. For example, it is desired that the firmware for an end device be signed and verified before it is accepted and executed. Unverified information can lead to system damage or device vulnerability. Conventional programmable devices in an industrial control network store only a single root certificate, and may have limited or no connectivity to a Certificate Authority. Accordingly, the root certificate becomes the final point of authentication for the device. It is appreciated that problems arise when the private key associated with the root certificate becomes compromised. If this occurs, the only method to recover in a system without access to a Certificate Authority is to download, or otherwise remotely obtain, a new and secure root certificate. Conventionally, this is performed by embedding an update for the device in a firmware update or transmitting a new root certificate to replace the compromised root certificate. However, even in these situations the compromised root certificate must be used to verify the update once it is received at the device. Only then can the update replace the compromised root certificate with the new and secure root certificate. From that point on, the new and secure root certificate is used to validate received packages. Unfortunately, this process requires the device to receive the package including the new and secure root certificate. Often updates will be missed or skipped and the device will never receive the replacement root certificate. As a result, no new root certificate will be received and activated, and all further data packages will be denied by the device. Accordingly, aspects and embodiments as discussed herein address the problems of verifying signatures on a data package and replacing root certificates by storing multiple, redundant root certificates locally at the programmable device. Various embodiments discussed herein allow the programmable device to continue to function, revoke, and replace a compromised root certificate, even if the active root certificate or private key has been compromised.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Industrial Control System

Various embodiments utilize one or more programmable devices and computer systems to validate and replace compromised root certificates at a programmable device. FIG. 1 illustrates one of these embodiments, an industrial control system 100. As shown, FIG. 1 includes a programmable device 102, a system manager 104, an industrial control network 106, one or more users of the programmable device 108, and one or more users of the system manager 110. The programmable device 102 can include any device with configurable operations, such as the programmable device described below with reference to FIG. 2. The system manager 104 can include one or more computer systems, such as the computer system described below with reference to FIG. 3.

As depicted in FIG. 1, the system manager 104 and the programmable device 102 exchange (i.e., send or receive) information via the industrial control network 106. The industrial control network 106 can include any network used to connect devices for factory automation and process control applications, and any communication network through which industrial devices may exchange information. This may include various industrial protocols. As referred to herein, an industrial protocol includes any standard for communicating between devices utilized within an industrial facility. Examples of industrial protocols include MODBUS, Powerlink, EtherCAT, and Profinet. Some industrials protocols structure communications in a master-slave arrangement, although industrial protocols are not limited thereto. Some examples of industrial protocols are known for accommodating electronically noisy environments. In a further example, the network 106 can include private networks such as LANs, WANs, extranets, intranets, and cloud computing systems. Alternatively, the network 106 may be an Ethernet LAN running MODBUS over TCP/IP. It is to be appreciated that, in some embodiments, the network 106 includes security features that prevent unauthorized access to the network. In these embodiments, the system seeking access to the network must provide valid credentials prior to gaining access to the network.

In at least one embodiment, the system manager 104 includes one or more components, such as a package manager 116, configured to exchange information, such as packages, with the programmable device 102. In one embodiment, packages may include executable and non-executable content. These packages may have been signed using a private key owned by the transmitter of the package. In at least one embodiment, packages are associated with a certificate identifying the transmitter of the package. The certificate may be signed using the Certificate Authority private key. The certificate may also include a public key associated with the private key used to sign the package. In some embodiments, the package may also include a series of instructions or commands for the programmable device 102. As used herein, packages may include any information. For example, a package can include an executable package, such as a software component installation unit. In further embodiments, private/public key pairs utilized in certificates tied back to the root Certificate Authority, permit the transmitter of the package to sign the package and indicate the identity of the transmitter, which can be validated using the public key. Instructions or commands included in the package can include, for example, firmware updates, licenses, configuration files, or subcomponent upgrades. Accordingly, it is desirable to ensure that a received package is from the proper source (i.e., the sender described above). For example, it is desirable to validate that a firmware update is from the device manufacturer and has not been tampered with. In various embodiments, the package can further include information identifying a destination to which the packages are to be sent. In one such embodiment, the system manager 104 can implement a Public Key Infrastructure (PKI) configured to transmit the package using a certificate signed by a private (root) key of associated with a device or family of devices, uniquely identifying the programmable device 102 as the targeted recipient of the package.

In various embodiments, the system manager 104 (e.g., PKI) can include one or more components configured to receive an indication that a certificate has been compromised. For example, the PKI can be configured to receive from one or more users, or an external computing system, input identifying a compromised root certificate or private key. In other embodiments, one or more components of the PKI may be configured to query an outside source to verify the security of a private key or root certificate. As used herein, a compromised key or root certificate can include any key or root certificate that has been exposed or is otherwise vulnerable to security threats.

Accordingly, to resolve the security threat of a compromised root certificate, the package manager 116 of the system manager 104 can be further configured to transmit an identifier corresponding to a secondary root certificate at the programmable device 102. However, in some embodiments the identifier may correspond to an active root certificate, a tertiary root certificate, or any other root certificate stored at the programmable device. As discussed above, in one embodiment the identifier includes a certificate. The system manager 104 may also transmit a package associated with the certificate and including a command to activate the root certificate corresponding to the private key, such as the secondary root certificate. As described in further detail below, in one embodiment the certificate indicates to the programmable device 102 which root certificate (e.g., secondary root certificate) corresponds to the private key used to sign the certificate. Various instructions or commands can additionally execute processes to replace, revoke, or remove one or more of the redundant root certificates stored at the programmable device 102, such as the active root certificate. In some embodiments, the package may additionally include one or more replacement root certificates. In some embodiments, simply receiving a certificate signed by a private key corresponding to a non-active public root certificate will invalidate the active root certificate and promote a secondary root certificate to the active root certificate position.

In at least one example, the programmable device 102 only accepts and performs commands and instructions provided in a package after validating the signature of the certificate and decrypting the package using the public key associated with the certificate. Accordingly, the programmable device 102 validates the certificate by processing the certificate with a root certificate identified within the received certificate. Via this processing, the device 102 verifies the certificate if the certificate provided is signed by an active root certificate private key corresponding to a root certificate at the programmable device 102. It then uses the public key provided by the certificate to validate the signature of the package and decrypt the package. Successful processing confirms that the package has not been tampered with and originated from the proprietor of the private key used to sign the package. In one embodiment, once the package has been decrypted, the programmable device 102 grants access and executes commands and instructions provided in the package. As discussed above, in some embodiments, instructions can instruct the device to replace or otherwise modify data stored in the device using data stored in the package. In one embodiment, the programmable device 102 grants access to configuration information to configure operational parameters of the programmable device. In various embodiments, the device can receive a replacement root certificate.

To address the security concerns outlined herein, in some embodiments, the programmable device 102 includes one or more components, as illustrated in FIG. 1, configured to store a plurality of root certificates, including an active root certificate and one or more secondary root certificates. Root certificates may be predisposed on the programmable device 102 during its manufacture and provided from one or more Certificate Authorities. It is appreciated that in one embodiment, a plurality of secondary root certificates from a plurality of Certificate Authorities provides an additional layer of security at the programmable device 102. In contrast to conventional certificate validation methods, redundant root certificates are stored on the programmable device 102. In one embodiment, a certificate component 114 of the programmable device 102 stores the redundant root certificates in a hierarchical format. For example, the active root certificate acts as the default root certificate, and only when the active root certificate has been revoked, is the secondary root certificate utilized. In one embodiment, the programmable device 102 is configured to store a plurality of secondary root certificates. In various other embodiments, the programmable device 102 can be further configured to store a third, tertiary root public certificate subordinate to the secondary root certificate. Similar to the secondary root certificate, the tertiary root certificate can be stored in a hierarchical format such that when the secondary root certificate is activated, the tertiary root certificate is promoted to replace the secondary root certificate as a new secondary root certificate. The tertiary root certificate, as well as the active and secondary, can be stored at the device, such as in volatile memory of the programmable device 102. Although described in one embodiment as including a secondary root certificate and a tertiary root certificate, in various other embodiments, the programmable device can be configured to store a plurality of root certificates arranged in a hierarchy having any number of levels.

In some embodiments, the programmable device 102 further includes a component configured to receive additional or replacement root certificates. For example, in one embodiment the programmable device can receive a replacement root certificate in association with the received certificate. In response to validating the certificate using the secondary root certificate, the programmable device may validate the replacement root certificate using the certificate. Accordingly, in one embodiment, the replacement root certificate can be accepted by the certificate component 114 of the programmable device 102 and stored in the hierarchical format discussed above. In response to activation of the secondary root certificate, the replacement root certificate can be stored in the position of the secondary root certificate, or, assuming a tertiary root certificate has been promoted to the position of the secondary root certificate, the tertiary root certificate position. Accordingly, the programmable device 102 can be configured to receive and replenish the redundant root certificates.

As discussed above, storage of redundant root certificates at the programmable device 102 avoids the security and missed update concerns of conventional certificate replacement systems. Regardless of the timing or version of the certificate received, the programmable device 102 has a redundant root of trust public certificate capable of verifying the received certificate. In one embodiment, in response to receiving an identifier of a secondary root certificate of the one or more secondary root certificates, one or more components of the programmable device 102 are configured identify the corresponding secondary root certificate. In one embodiment, this includes dereferencing the identifier to identify the secondary root certificate. As referred to herein, dereferencing an identifier includes resolving the identity of an object from the identifier. Examples of dereferencing an identifier include determining an instance of an object from a pointer to the address of the object, determining an instance of an object from an index into an array of objects, and determining an instance of an object by querying a cross-reference (e.g., a look-up table, hierarchical database, relational database, object oriented database, or the like) using the identifier of the object. Examples disclosed herein are not limited to particular processes for dereferencing objects. In other embodiments, identifying the secondary root certificate includes iterating through all non-active root certificates to determine the secondary root certificate corresponding to the private key.

Once the use of a secondary root certificate is determined, the programmable device 102 may validate the received certificate using the secondary root certificate. However, if a root certificate is not identified the process proceeds to validating the certificate with the active root certificate. In some embodiments, the programmable device 102 is configured to send a response to the system manager, or system transmitting the certificate, indicating that the certificate was received and validated, or received and no corresponding certificate was identified.

In one embodiment, one or more components of the programmable device 102, such as the validation component 112, permit the programmable device 102 to attempt to validate the certificate. The validation component 112 can be configured to validate the certificate with the secondary root certificate identified by the identifier or certificate (or with the active root certificate where the identifier identifies no root certificate). After the signature of the certificate is validated by the root certificate in the device, the validation component may proceed to decrypting the package using the public key provided in the certificate. A success confirms that the package has not been tampered with and originated from the transmitter of the package and holder of the private key used to sign the package. If the certificate is validated and the package is decrypted, access to the package's contents is granted and the package is applied to the programmable device. In contrast, if validation is unsuccessful, the certificate is denied and access is denied. As discussed above, in various embodiments, the programmable device 102 can be configured to send a response to the system manager 104, or system transmitting the certificate and package, indicating that the package was received and accessed, or received and not validated. Accordingly, transmitting a certificate signed by the private key corresponding to the secondary root certificate enables the managing device 104, or transmitter, to avoid transmitting a certificate with a signature corresponding to an insecure certificate or private key.

In various embodiments, the programmable device may also be configured to activate the secondary root certificate. For example, this may be performed in response to validating the certificate. In one embodiment, the validation component 112 is configured to execute one or more commands included in the package associated with the certificate, in response to validating the certificate. Accordingly, the validation component 112 replaces the active root certificate with the identified secondary root certificate. In various embodiments, this includes replacing a compromised root certificate or certificate associated with a compromised private key with a safe certificate, accordingly ensuring security of the programmable device. In various embodiments, the validation component is further configured to remove the active root certificate in response to activating the secondary root certificate. Removing can include erasing or otherwise deleting the active root certificate.

In further embodiments, one or more components of the programmable device 102 can be configured to receive, a second, third, fourth, or any further certificate and associated package from the system manager 104. Once the secondary root certificate has been activated, the secondary root certificate acts as the active root certificate and is used to validate further received certificates. For example, the validation component can receive a second certificate signed using a private key corresponding to the newly activated root certificate.

Embodiments of the industrial control system 100 are not limited to the particular configuration illustrated in FIG. 1. This configuration is included for the purposes of illustration only. In addition, it is to be appreciated that various examples utilize a variety of hardware components, software components and combinations of hardware and software components that are configured to perform the processes and functions described herein. Thus the scope of the embodiments disclosed herein is not limited to a particular set of hardware, software, or a combination thereof.

Programmable Device

As discussed above with regard to FIG. 1, various aspects and functions described herein may be implemented as specialized hardware or software components executing in one or more programmable devices. These programmable devices are configured to independently (i.e., without instructions from a centralized control system) perform one or more specialized automated functions on a periodic basis. Programmable devices have a wide range of potential applications. The characteristics of particular types of programmable devices vary depending on the function that the programmable device is configured to perform. For instance, programmable devices configured for external use may include a rigid and insulated housing, while programmable devices configured to monitor environmental conditions may include one or more sensors configured to measure these environmental conditions. Some specific examples of programmable devices include uninterruptible power supplies, programmable logic controllers, circuit breakers, protective relays, motor controllers, industrial hardware, and utility meters, such as a utility meter 200 as illustrated in FIG. 2.

Figure 2:
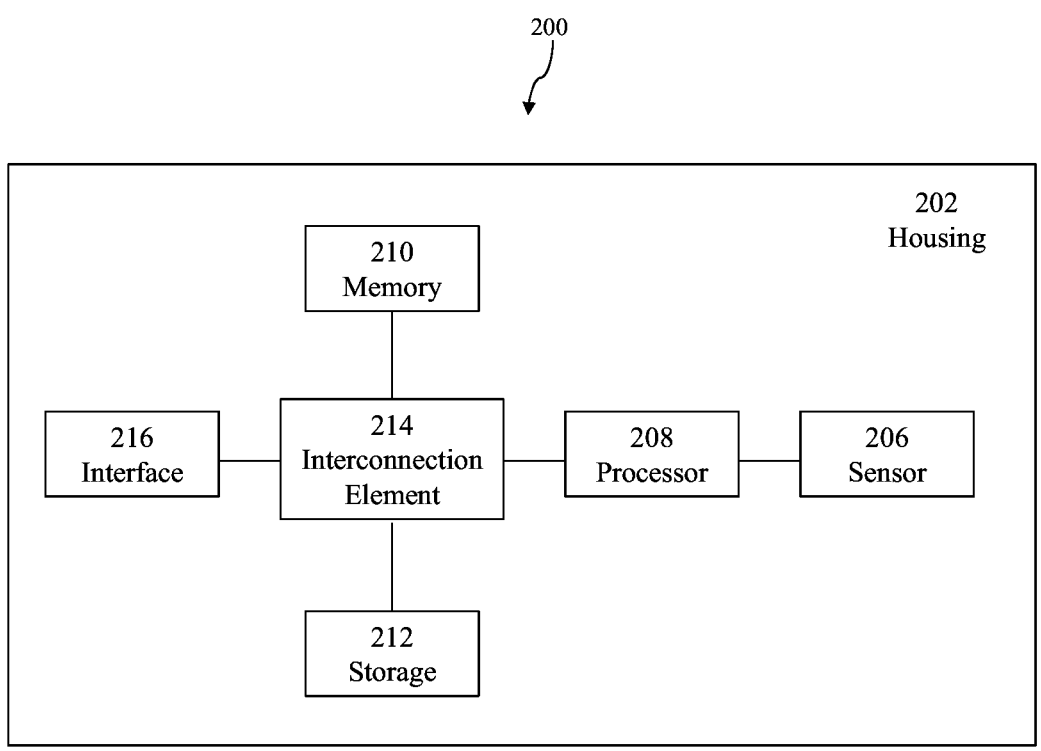
FIG. 2 is a schematic diagram of an example programmable device that executes processes and functions disclosed herein.

As shown in FIG. 2, the utility meter 200 comprises a housing 202 that includes, a sensor 206, a processor 208, a memory 210, a data storage device 212, an interconnection element 214, and an interface 216. To implement at least some of the aspects, functions, and processes disclosed herein, the processor 208 performs a series of instructions that result in manipulated data. The processor 208 may be any type of processor, multiprocessor, or controller.

The memory 210 stores programs and data during operation of the utility meter 200. Thus, the memory 210 include any device for storing data, such as a disk drive or other non-volatile storage device, but typically includes a relatively high performance, volatile, random access memory such as a dynamic random access memory (DRAM) or static memory (SRAM). Various embodiments may organize the memory 210 into particularized and, in some cases, unique structures to perform the functions disclosed herein. These data structures may be sized and organized to store values for particular data and types of data.

As shown in FIG. 2, several of the components of the utility meter 200 are coupled to the interconnection element 214. The interconnection element 214 may include any communication coupling between components of the utility meter, such as one or more physical busses subscribing to one or more specialized or standard computing bus technologies such as I$^2$C and SPI. The interconnection element 214 enables communications, such as data and instructions, to be exchanged between components of the utility meter 200.

The utility meter 200 also includes one or more interface devices 216 such as input devices, output devices and combination input/output devices. Interface devices may receive input or provide output. More particularly, output devices may render information for external presentation. Input devices may accept information from external sources. Examples of interface devices include buttons, keyboards, touch screens, network interface cards, and the like. Interface devices allow the utility meter 200 to exchange information with and to communicate with external entities, such as users and other systems.

The data storage device 212 includes a computer readable and writeable nonvolatile, or non-transitory, data storage medium in which instructions are stored that define a program or other object that is executed by the processor 208. The data storage 212 also may include information that is recorded, on or in, the medium, and that is processed by the processor 208 during execution of the program. More specifically, the information may be stored in one or more data structures specifically configured to conserve storage space or increase data exchange performance. The instructions may be persistently stored as encoded signals, and the instructions may cause the processor 208 to perform any of the functions described herein. The medium may, for example, be optical disk, magnetic disk or flash memory, among others.

As shown in FIG. 2, the sensor 206 is coupled to the processor 208. The sensor 206 includes an analog sensor and analog to digital converter to provide the processor 208 with a digital signal that represents a quantity of flow (e.g. usage) of a utility as detected by the analog sensor. The particular configuration of the sensor 206 varies depending on the utility being measured by the utility meter 200. For example, in an embodiment including a meter that measures electric, the sensor 206 includes inputs for single phase or three phase power and records periodic measurements of one or more identified characteristics (e.g., power, voltage, current, etc.) of the electric via the inputs. Upon receipt of these periodic measurements, the processor 208 stores information descriptive of the measurements and the times that the measurements were taken in the data storage element 212. Further, in some embodiments, the processor 208 subsequently transmits the stored information descriptive of the measurements to an external entity via a network interface included in the interface devices 216.

Some embodiments of the utility meter 200 include operational parameters that may be configured via protected functionality provided by the utility meter 200. These operational parameters may be used to configure CT/PT ratio, system type, demand calculations, I/O setup, onboard data logging, onboard waveform capture, and onboard alarming.

Although the utility meter 200 is shown by way of example as one type of utility meter upon which various aspects and functions may be practiced, aspects and functions are not limited to being implemented on the utility meter 200 as shown in FIG. 2. Various aspects and functions may be practiced on one or more utility meters having a different architectures or components than that shown in FIG. 2. For instance, the utility meter 200 may include specially programmed, special-purpose hardware, such as an application-specific integrated circuit (ASIC) tailored to perform one or more particular operations disclosed herein.

In some examples, the components of the utility meter 200 disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 3:
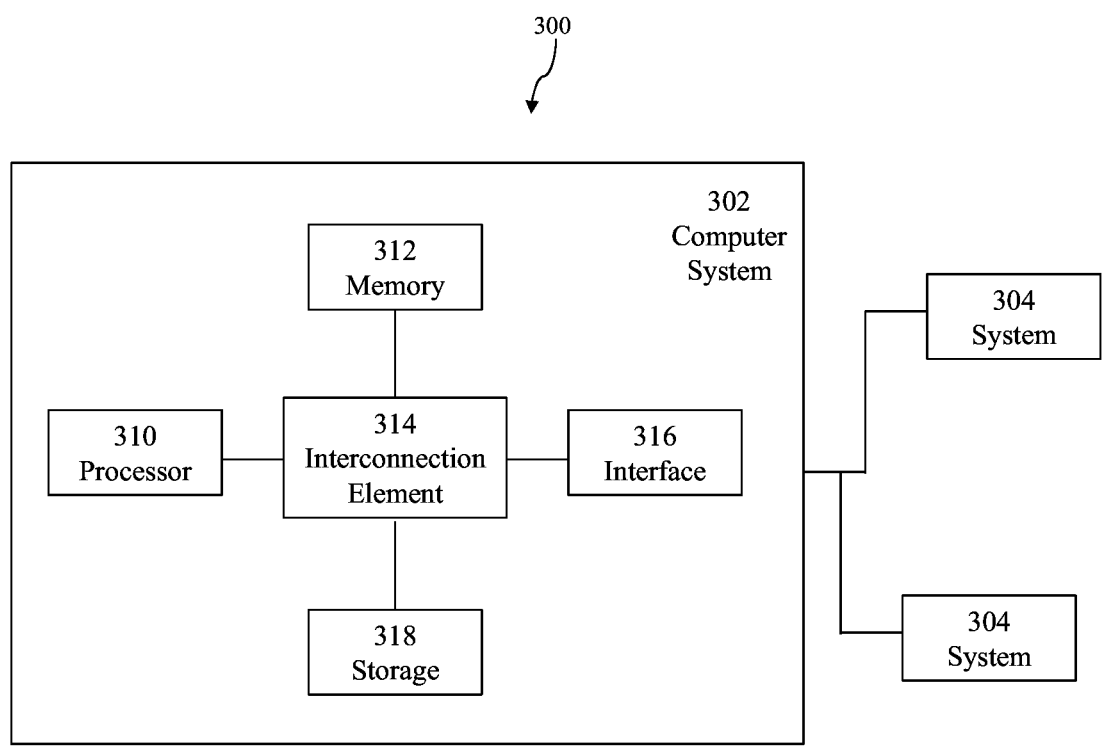
FIG. 3 is a schematic diagram of an example of a computer system that executes processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302 and 304 and utility meter 300. As shown, the computer systems 302 and 304 and utility meter 300 are interconnected by, and may exchange data through, a communication network 308. The network 308 may include any communication network through which computer systems may exchange data. To exchange data using the network 308, the computer systems 302 and 304 and utility meter 300 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 302 and 304 and utility meter 300 may transmit data via the network 308 using a variety of security measures including, for example, TLS, SSL, or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, an interconnection element 314, an interface 316 and data storage element 318. To implement at least some of the aspects, functions, and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip.

The processor 310 is connected to other system components, including one or more memory devices 312, by the interconnection element 314.

The memory 312 stores programs and data during operation of the computer system 302. Thus, the memory 312 may be a relatively high performance, volatile, random access memory such as a dynamic random access memory ("DRAM") or static memory ("SRAM"). However, the memory 312 may include any device for storing data, such as a disk drive or other nonvolatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the interconnection element 314. The interconnection element 314 may include any communication coupling between system components such as one or more physical busses in conformance with specialized or standard computing bus technologies such as $I^2C$, SPI, and PCI. The interconnection element 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage element 318 includes a computer readable and writeable nonvolatile, or non-transitory, data storage medium in which instructions are stored that define a program or other object that is executed by the processor 310. The data storage element 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage element 318. The memory may be located in the data storage element 318 or in the memory 312, however, the processor 310 manipulates the data within the memory, and then copies the data to the storage medium associated with the data storage element 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Industrial Control Process

Figure 4:
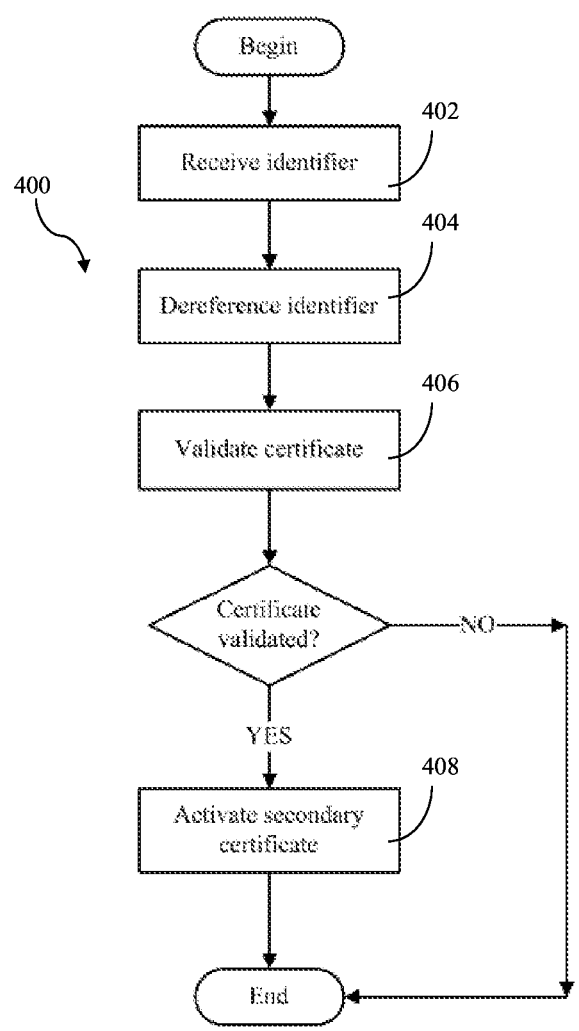
FIG. 4 is a flow diagram of an example validation and certificate replacement process.

As described above with reference to FIG. 1, several embodiments perform processes that validate and replace root certificates at a programmable device. In some embodiments, these processes are executed by an industrial control system, such as the system 100 described above with reference to FIG. 1. One example of such a process is illustrated in FIG. 4. According to this example, the process 400 includes acts of receiving an identifier of a secondary root certificate of the one or more secondary root certificates, and activating the secondary root certificate in response to receiving the identifier. As discussed above, in various embodiments, the identifier includes a certificate signed by a private key corresponding to the secondary root certificate. In some embodiments, the process may additionally include dereferencing the identifier and validating the certificate.

In act 402, a programmable device of the industrial control system, such as the programmable device described above with reference to FIG. 1, receives an identifier. As discussed herein, in various embodiments the identifier includes a certificate. In further embodiments, the programmable device may also receive a package associated with the certificate. In one embodiment the certificate is signed using a Certificate Authority private key and the package is signed using a private key of the transmitter. The certificate may include a public key corresponding to the private key used to sign the package (i.e., the private key of the transmitter). The private key used to sign the certificate may, for example, correspond to a secondary root certificate of one or more secondary root certificates stored at the programmable device. However, in some embodiments the private key may correspond to an active root certificate, a tertiary root certificate, or any other root certificate stored at the programmable device. In further embodiments the package can include one or more commands to activate the secondary root certificate.

In act 404, the programmable device dereferences the identifier to identify the secondary root certificate or other root certificate corresponding to the Certificate Authority private key used to sign the certificate. As discussed above, dereferencing an identifier includes resolving the identity of an object from the identifier. Examples of dereferencing an identifier include determining an instance of an object from a pointer to the address of the object, determining an instance of an object from an index into an array of objects, and determining an instance of an object by querying a cross-reference (e.g., a look-up table, hierarchical database, relational database, object oriented database, or the like) using the identifier of the object. Examples disclosed herein are not limited to particular processes for dereferencing objects. If a secondary root certificate is identified, the process proceeds to validating the certificate with the secondary certificate. However, if a secondary root certificate is not identified the process proceeds to validating the certificate with the active root certificate. As discussed above, in one embodiment the programmable device can transmit a response to the system manager, or system transmitting the certificate, indicating that the certificate was received and or denied.

In act 406, the programmable device validates the certificate using the secondary root certificate. Although described herein as using the secondary root certificate, in various embodiments, the active root certificate, or other root certificate identified by the certificate as described above may be used to validate the certificate. Validation can include processing the certificate with the secondary root certificate identified within the certificate. Via this processing, the device verifies the certificate if the certificate provided is signed by a private key corresponding to a root certificate at the programmable device. The device then uses the public key provided by the certificate to decrypt the associated package. Successful processing confirms that the package has not been tampered with and originated from the proprietor of the private key used to sign the package. In one embodiment, once the package has been decrypted, the programmable device 102 grants access and executes commands and instructions provided in the package. In contrast, if validation fails, the package is denied and access is not granted. As discussed above, in various embodiments, the programmable device can be configured to transmit a response to the system manager, or system transmitting the certificate and package, indicating that the package was received and processed, or received and not validated. Accordingly, transmitting a certificate signed by a private key corresponding to the secondary root certificate enables the managing device, or certificate transmitter, to avoid transmitting a certificate with a signature corresponding to an insecure certificate or private key.

Although described in one embodiment as dereferencing the identifier by identifying, within a cross-reference, an association between the identifier and the secondary root certificate, in some embodiments the process can include dereferencing the identifier by iteratively attempting to validate the certificate using root certificates of the plurality of root certificate. The programmable device attempts to verify the signature with a first root certificate stored at the programmable device. If successful, the iteration process stops. However, if validation is not successful, the next root certificate is attempted.

In act 408, the programmable device activates the secondary root certificate. For example, this may be performed in response to validating the certificate using the secondary root certificate. In one embodiment, the programmable device executes one or more commands included in the package, in response to decrypting the package. Accordingly, the validation component replaces the active root certificate with the identified secondary root certificate. In various embodiments, this includes replacing a compromised root certificate or certificate associated with a compromised private key with a secure root certificate, accordingly ensuring security of the programmable device. In various embodiments, the process may further include removing the active root certificate in response to activating the secondary root certificate. Removing can include erasing or otherwise deleting the active certificate.

While not shown in FIG. 4 in various embodiments, the process 400 can further include receiving a replacement certificate at the programmable device and storing the replacement certificate. In one embodiment, the one or more replacement root certificates are included in the package. However, in various other embodiments the replacement root certificates may be received separately. In response to validating the certificate using the second root certificate, the process can further include validating the replacement root certificate using the received certificate. Once the replacement certificate has been verified, it may be stored within the plurality of root certificates.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A programmable device configured for use within an industrial control system, the programmable device comprising:
    a memory storing a plurality of Certificate Authority root of trust certificates, the plurality of Certificate Authority root of trust certificates including at least an active Certificate Authority root of trust certificate, a secondary Certificate Authority root of trust certificate, and a tertiary Certificate Authority root of trust certificate stored at the memory in a hierarchical format, wherein in the hierarchical format the tertiary Certificate Authority root of trust certificate is subordinate to the secondary Certificate Authority root of trust certificate;
    at least one processor in data communication with the memory and an interface to exchange information within an industrial control network; and
    one or more components executable by the at least one processor and collectively configured to:
        receive an identifier of the secondary Certificate Authority root of trust certificate of the plurality of Certificate Authority root of trust certificates through the industrial control network according to an industrial protocol;
        activate the secondary Certificate Authority root of trust certificate to replace the active Certificate Authority root of trust certificate in response to receiving the identifier through the industrial control network, the active Certificate Authority root of trust certificate being revoked; and
        responsive to the activation of the secondary Certificate Authority root of trust certificate, promote the tertiary Certificate Authority root of trust certificate to replace the secondary Certificate Authority root of trust certificate.

2. The system according to claim 1, wherein the programmable device includes one of a utility meter, a circuit breaker, a protective relay, a programmable logic controller, a motor controller, and industrial network hardware.

3. The system according to claim 1, wherein the plurality of Certificate Authority root of trust certificates includes one or more Certificate Authority root of trust certificates received from a plurality of certificate authorities.

4. The system according to claim 1, wherein the identifier includes a certificate signed by a private key corresponding to the secondary Certificate Authority root of trust certificate.

5. The system according to claim 4, wherein the one or more components are collectively further configured to:
    receive a package in association with the certificate, the package including at least one of a configuration file, a firmware update, license information, and a subcomponent upgrade;
    validate the certificate using the secondary Certificate Authority root of trust certificate;
    decrypt the package using a public key associated with the certificate; and
    apply the package to the programmable device.

6. The system according to claim 4, wherein the one or more components are collectively further configured to:
    receive a replacement Certificate Authority root of trust certificate in association with the certificate;
    validate the certificate using the secondary Certificate Authority root of trust certificate;
    validate the replacement Certificate Authority root of trust certificate using the certificate; and
    store the replacement Certificate Authority root of trust certificate within the plurality of Certificate Authority root of trust certificates responsive to validating the certificate.

7. The system according to claim 1, wherein the one or more components are collectively further configured to dereference the identifier to identify the secondary Certificate Authority root of trust certificate.

8. The system according to claim 7, wherein the identifier includes a certificate signed by a private key corresponding to the secondary Certificate Authority root of trust certificate and the one or more components are collectively configured to dereference the identifier at least in part by validating the certificate using the secondary Certificate Authority root of trust certificate.

9. The system according to claim 7, wherein the one or more components are collectively configured to dereference the identifier at least in part by identifying, within a cross-reference, an association between the identifier and the secondary Certificate Authority root of trust certificate.

10. The system according to claim 7, wherein the identifier includes a certificate signed by a private key corresponding to the secondary Certificate Authority root of trust certificate and the one or more components are collectively further configured to dereference the identifier at least in part by iteratively attempting to validate the certificate using root certificates of the plurality of Certificate Authority root of trust certificates.

11. The system according to claim 1, wherein the one or more components executable by the at least one processor are collectively further configured to remove the active Certificate Authority root of trust certificate responsive to activating the secondary Certificate Authority root of trust certificate.

12. A method comprising:
    storing, at a programmable device having a memory, a plurality of Certificate Authority root of trust certificates, the plurality of Certificate Authority root of trust certificates including at least an active Certificate Authority root of trust certificate, a secondary Certificate Authority root of trust certificate, and a tertiary Certificate Authority root of trust certificate stored in a hierarchical format, wherein in the hierarchical format the tertiary Certificate Authority root of trust certificate is subordinate to the secondary Certificate Authority root of trust certificate;
    receiving, at the programmable device having the memory, an identifier of the secondary Certificate Authority root of trust certificate of the plurality of Certificate Authority root of trust certificates through an industrial control network according to an industrial protocol;
    activating the secondary Certificate Authority root of trust certificate to replace the active Certificate Authority root of trust certificate in response to receiving the identifier through the industrial control network, the active Certificate Authority root of trust certificate being revoked; and responsive to the activation of the secondary Certificate Authority root of trust certificate, promoting the tertiary Certificate Authority root of trust certificate to replace the secondary Certificate Authority root of trust certificate.

13. The method according to claim 12, wherein the identifier includes a certificate signed by a private key corresponding to the secondary Certificate Authority root of trust certificate.

14. The method according to claim 13, further comprising:

receiving a package in association with the certificate, the package including at least one of a configuration file, a firmware update, license information, and a subcomponent upgrade;

validating the certificate using the secondary Certificate Authority root of trust certificate;

decrypting the package using a public key associated with the certificate; and applying the package to the programmable device.

15. The method according to claim 13, further comprising:

receiving a replacement Certificate Authority root of trust certificate in association with the certificate;

validating the certificate using the secondary Certificate Authority root of trust certificate;

validating the replacement Certificate Authority root of trust certificate using the certificate; and storing the replacement Certificate Authority root of trust certificate within the plurality of Certificate Authority root of trust certificates responsive to validating the certificate.

16. The method according to claim 12, further comprising:

dereferencing the identifier to identify the secondary Certificate Authority root of trust certificate.

17. The method according to claim 16, wherein dereferencing the identifier includes identifying, within a cross-reference, an association between the identifier and the secondary Certificate Authority root of trust certificate.

18. The method according to claim 16, wherein the identifier includes a certificate signed by a private key corresponding to the secondary Certificate Authority root of trust certificate and dereferencing the identifier includes iteratively attempting to validate the certificate using root certificates of the plurality of Certificate Authority root of trust certificates.

19. A non-transitory computer readable medium having stored thereon sequences of instruction including instructions that will cause at least one processor to:

store, at a programmable device having a memory, a plurality of Certificate Authority root of trust certificates, the plurality of Certificate Authority root of trust certificates including at least an active Certificate Authority root of trust certificate, a secondary Certificate Authority root of trust certificate, and a tertiary Certificate Authority root of trust certificate in a hierarchical format, wherein in the hierarchical format the tertiary Certificate Authority root of trust certificate is subordinate to the secondary Certificate Authority root of trust certificate;

receive, at the programmable device, an identifier of the secondary Certificate Authority root of trust certificate of the plurality of Certificate Authority root of trust certificates through an industrial control network according to an industrial protocol;

activate the secondary Certificate Authority root of trust certificate to replace the active Certificate Authority root of trust certificate in response to receiving the identifier through the industrial control network, the active Certificate Authority root of trust certificate being revoked; and responsive to the activation of the secondary Certificate Authority root of trust certificate, promote the tertiary Certificate Authority root of trust certificate to replace the secondary Certificate Authority root of trust certificate.

20. The computer readable medium according to claim 19, wherein the identifier includes a certificate signed by a private key corresponding to the secondary Certificate Authority root of trust certificate.

* * * * *